J. J. MERVESP.
HORSESHOES.

No. 195,222.  Patented Sept. 18, 1877.

WITNESSES:
S. Pint Rawle
W Moon

John J. Mervesp,
INVENTOR.

N. PETERS, PHOTO-LITHOGRAPHER, WASHINGTON, D. C.

UNITED STATES PATENT OFFICE.

JOHN J. MERVESP, OF EAST NEWARK, NEW JERSEY.

IMPROVEMENT IN HORSESHOES.

Specification forming part of Letters Patent No. 195,222, dated September 18, 1877; application filed July 13, 1876.

*To all whom it may concern:*

Be it known that I, JOHN J. MERVESP, of the town of East Newark, in the county of Hudson and State of New Jersey, have invented a new and useful Improvement in Horseshoes, which improvement is fully set forth in the following specification, reference being had to the accompanying drawings.

The object of this invention is to facilitate the attachment to and the detachment from the shoes of horses or other animals of calks without removing the shoes from their hoofs; and the invention consists in the combination, with a horseshoe, of detachable toe and heel calks provided with two or more tapering shanks, fitting into appropriate holes in the shoe, and in having one or both of the shanks deviate from the perpendicular about one-eighth or three-sixteenths of an inch in the length of the shank of the calk, and in other details, as hereinafter described and set forth.

Figure 3:
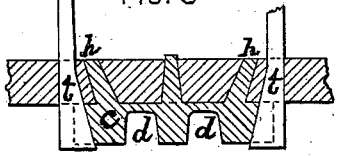
Figure 4:
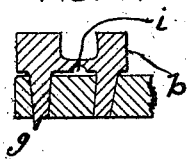
Figure 6:
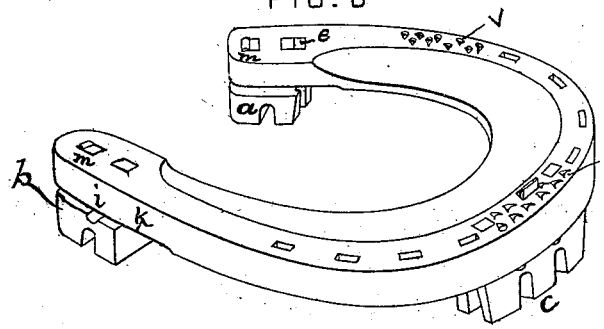

The heel-calk shown in Fig. 4 has a spur upon its shank nearest the end of the heel of the shoe, as shown at $g$, which is bent over the heel of the shoe, as shown at $m\,m$, Fig. 6, by hammering or pressing upon the calk after it is driven into the shoe, while the latter is on the horse's hoof. The calk upon the outside of the shoe being subjected to more wear and strain than the calk upon the inside of the shoe, is secured, in addition, by the wedge $e$. The toe-calk is, in addition to the oblique shanks $h\,h$, further secured by two nails, $t\,t$, passing through a slot in either end, as seen in Fig. 3, which serve to steady the calk in case of a sudden jar or strain. The shoe is also provided with teeth $v$ in the toe and outside, which teeth, piercing the hoof, serve the place of clips and keep the shoe in position.

Figure 1:
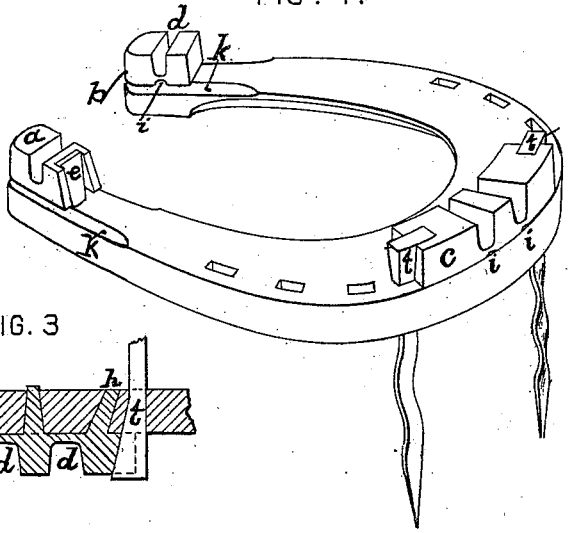
Figure 2:
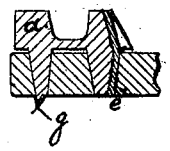
Figure 5:
Figure 7:
Figure 8:
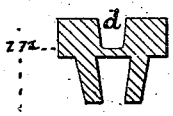
Figure 9:
Figure 10:
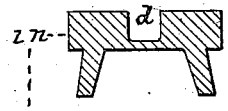
Figure 11:
Figure 12:
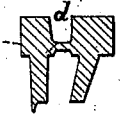
Figure 13:
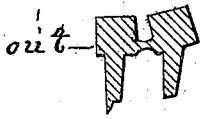

The shoe and calks are illustrated more in detail in the following views: Figure 1 is a perspective view of the shoe with the calks in position. Fig. 2 is a section of the calk $a$, Figs. 1 and 6. Fig. 3 is a section of the toe-calk $c$. Fig. 4 is a section of the heel-calk $b$. Figs. 5 and 7 are views of the nails $t$, which help to secure the toe-calk $c$. Fig. 6 is a perspective view of the reverse side of the shoe shown in Fig. 1. Fig. 8 is a section of a heel-calk as it appears when in the shoe. Fig. 9 is a view of Fig. 8 bent before entering the shoe. Fig. 10 is another form of calk, in section, as it appears when in the shoe. Fig. 11 is a view of Fig. 10 before entering the shoe. Fig. 12 is a section of another form of calk as it appears when in the shoe, and Fig. 13 is a view of Fig. 12 prepared to enter the shoe.

Finding from experience that perpendicular calks will not remain in a shoe, I have made the shanks of the calks described in this specification at a deviation from a straight line of about one-eighth of an inch in the length of the shank, as seen in Figs. 8, 10, and 12. The calk shown in Fig. 3 is bent similar to the calk shown in Figs. 10 and 11. This is necessary in order to insert it in the shoe. The object of the depressions or grooves $d\,d$ is to facilitate the bending of the calk in attaching or detaching. When this calk is bent inward, having the ends of the shanks in line with the orifice in the shoe, it is pressed or hammered into its place. It is obvious that the obliquity of the shanks keeps the calk firmly attached to the shoe. After the calk is pressed into position the two nails $t\,t$ are driven into their places, the heads engaging with the slots in the ends of the calk $c$. This calk is removed by a tool having two tapering prongs, which enter the grooves $i\,i$ after the nails are removed and pry up the calk. The calk shown in Fig. 4 has two shanks, one being bent in out of line, while the other is plumb. This calk is inserted in the same manner as the toe-calk. After being driven into the shoe, a suitable tool is held under the part $g$ while the calk is hammered down. This has the effect of bending the part $g$, and helps materially to keep the calk secure. When this calk is to be removed the part $g$ is cut off, and a tool is inserted in the groove $i$, Fig. 6, by which means the calk is easily removed; or the calk may be cut through the groove at $d$, if difficulty is experienced in removing it. A punch is then placed on the end $m$ and the calk punched out. The calk shown in Fig. 2 has two tapering shanks. Before this calk is inserted in the shoe a wedge, $e$, is placed in one of the holes; then the calk is driven into its place, a suitable tool being held under the part $g$, same as described regarding calk shown in Fig. 4. Then the upper part of the wedge is pressed into a tapering groove in the body of the calk. This calk being upon the outside of the shoe, and being subjected to more wear and strain than the calk upon the inside, I find it necessary to use extra care in securing it; hence the presence of the wedge. This calk is removed after the wedge is pried out of the groove in the same way as the calk shown in Fig. 4.

It will be seen that the heels of the shoe are sloping by looking at $k\ k$, Figs. 1 and 6. This bevel or slope gives space to allow the insertion of a flat U-shaped tool, used to drive the calk out under the head of the calk when no groove is made in either calk or shoe.

For ordinary horses, such as express, hack, &c., I use the calks shown in Figs. 8 and 12 as heel-calks, and the calk shown in Fig. 10 as a toe-calk.

It is obvious that these calks must be bent outward, as in the case of Figs. 9 and 13, and bent inward as shown in Fig. 11, before they can be driven into the holes prepared for them in the shoe, during which process they are made to conform to the angles at which the holes are punched in the shoe—*i. e.*, Figs. 9, 11, and 13—and while being driven into the holes prepared for them in the shoe, they assume the positions shown in Figs. 8, 10, and 12, respectively. These calks, on account of the angle in which they are inserted, remain firmly seated in the shoe till worn; but for hard-working horses I make one of the shanks of the heel-calks (the shank nearest the end of the shoe) with a prolongation or spur, $g$, which is bent over the inside of the shoe, as seen at $m\ m$, Figs. 1 and 6.

There is quite a saving effected in having teeth inserted in the toe and outside of this shoe to serve the purpose of clips, as the teeth can be easily punched while the shoe is cold, whereas it requires time and coal to heat the shoe in order to put clips upon it. The shoe also has a much neater appearance when on the horse's hoof.

I claim—

1. A grooved heel-calk with two shanks, one perpendicular, with fastening-spur $g$, the other oblique, as shown in Fig. 4, in combination with the horseshoe formed with the beveled surfaces $k\ k$, substantially as described.

2. The outer heel-calk $a$, of form substantially as described, and secured in place by the wedge $e$, in combination with the shoe formed with the beveled surfaces $k\ k$, as set forth.

3. A grooved toe-calk with two or more shanks, two of which are oblique, as shown in Figs. 3 and 10, in combination with the nails and shoe with rasp-like teeth formed upon the upper surface of the toe only, as described, for the purpose specified.

JOHN J. MERVESP.

Witnesses:
S. PERIT RAWLE,
WM. MOON.